United States Patent Office 3,253,039
Patented May 24, 1966

3,253,039
CATALYTIC HYDROGENATION OF ORGANIC NITROCOMPOUNDS
Paul N. Rylander, Newark, and Irene Karpenko, Irvington, N.J., assignors to Engelhard Industries, Inc., Newark, N.J., a corporation of Delaware
No Drawing. Filed Feb. 5, 1962, Ser. No. 171,263
7 Claims. (Cl. 260—580)

This invention relates to hydrogenation of organic nitrocompounds and more especially to the catalytic hydrogenation of organic nitrocompounds.

The use of platinum group metals to catalyze hydrogenation reactions is known in the art. Because of the high cost of these catalysts and particularly of platinum, any method for increasing the activity and/or life of the catalysts is desirable and valuable.

It has been found, generally, that heavy metals such as Pb, Cu, Bi, Ni and Cr or their ions either behave as poisons or have little effect on platinum group metal catalysts such as Pt, Pd and Rh used in hydrogenation reactions. Specifically, it has been found that Pb, Cu, Ni, Bi and Cr behave as poisons for Pt catalysts in the hydrogenation of nitrobenzene. Ag has been found to poison Pd catalysts in the hydrogenation of nitrobenzene, and it has also been found that the presence of Ag with Pt catalysts does not alter the rate of hydrogenation of ketones and olefins.

In accordance with the present invention, the organic nitrocompound, for instance an aromatic or aliphatic nitrocompound, is hydrogenated in liquid phase in the presence of a supported platinum catalyst and silver as promoter for the catalyst, the silver being distributed throughout the liquid without being alloyed with the platinum. By reason of the presence of the silver, both the activity and life of the platinum catalyst is materially increased or enhanced. Further, by reason of the increased activity of the catalyst due to the silver, hydrogenation of the nitro-containing compounds is carried out at a considerably faster rate than when supported platinum per se is employed as catalyst, to produce valuable products such as aromatic and aliphatic amines.

The process of this invention is especially advantageous for the production of aliphatic and aromatic amines by the reduction of the nitro group or groups of the corresponding nitro aliphatic or aromatic compounds. For example, aniline is obtained by the reduction of nitrobenzene, p-aminotoluene by the reduction of p-nitrotoluene, and n-propyl amine by the reduction of nitropropane. The nitro groups of polynitro organic compounds, such as dinitro and higher polynitro compounds, can be reduced in accordance with this invention as well as mono-nitro compounds to form the corresponding diamines or higher polyamines. Hydrogenation of certain polynitro compounds such as aromatic trinitro compounds should be conducted at a relatively low temperature to reduce the explosion hazard. The nitro aromatic compounds suitable as feed or charge stocks in the reduction process of this invention can be either the mononuclear aromatics or the polynuclear or polycyclic aromatics. These aromatic compounds, in addition to containing one or more nitro substituents, may also be substituted by groups which are not by themselves capable of reduction by hydrogen under the conditions utilized herein and which do not interfere with the reduction of the nitro groups, for instance groups such as alkoxy, hydroxy, amino, acyloxy, alkyl, and aryl groups. The nitro aliphatic compounds suitable as charge stocks herein, in addition to containing one or more nitro substituents, can also be substituted with groups incapable of being reduced under the conditions utilized in the instant process and non-interfering with the reduction of the nitro groups, for instance groups such as alkoxy, hydroxy, carboxy, amino, and aryl. Exemplary of the nitro-containing aromatic compounds suitable as charge stocks in this invention are Nitrobenzene,
p-Nitrotoluene,
m-Nitrotoluene,
p-Nitrophenol,
m-Nitrobenzoic acid,
o-Nitrophenylacetic acid,
p-Methoxynitrobenzene,
m-Aminonitrobenzene,
4-Nitrobiphenyl,
4,4'-dinitrobiphenyl,
2,4-dinitrotoluene, and
2,6-dinitrotoluene.

Nitro-containing aliphatic compounds suitable as charge stocks herein include, for example, 1-nitropropane,
1-nitrobutane,
2-nitrobutane,
1-nitroisobutane,
2-nitroisobutane,
1-nitrobutanol-4,
1-nitro-5-methoxypentane,
1-nitro-4-phenylbutane,
1-nitro-5-methoxypentane,
1-nitro-4-phenylbutane,
1-nitro-6-aminohexane,
3-nitro-butyric acid, and
3-nitroethylbutyrate.

The Ag may be added in the form of a salt of an organic or inorganic acid, which is soluble or partially soluble in the reaction mixture. Less preferably, the Ag may be added in metallic form in the form of colloidal size particles with agitation during and after the addition to maintain the particles suspended throughout the reaction mixture. Examples of silver salts of inorganic acids which can be added are silver nitrate, silver nitrite, silver perchlorate and silver fluoride. Exemplary of the silver salts of organic acids are silver acetate, silver tartrate, silver benzoate and silver propionate.

While a silver salt which is only slightly soluble in the reaction mixture can be used, it is preferred to employ a soluble silver salt to facilitate distributing the silver in the reaction mixture.

The quantity of Ag utilized is determined by the amount of platinum metal present in the catalyst, and is utilized broadly within an atomic ratio range of about 0.05:1 to about 10:1 of Ag to Pt respectively. Although quantities greater than the about 10:1 upper limit of Ag to Pt can be utilized, if desired, such greater quantities of silver will provide little if any advantage and may be disadvantageous from an economic standpoint. Amounts of silver much below the about 0.05:1 lower limit of Ag to Pt should be avoided, as the promotional effect desired will not be attained with these smaller amounts. The atomic ratio of Ag to Pt of 0.05:1 respectively may be provided, for instance when adding the Ag as $AgNO_3$ and employing a Pt on carbon catalyst having a 5% Pt content, by adding 0.218 mg. $AgNO_3$ per 100 mg. of 5% Pt on carbon present. The atomic ratio of Ag to Pt of 10:1 respectively may be provided by adding 43.3 mg. $AgNO_3$ per 100 mg. of 5% Pt on carbon. The preferred quantity of Ag for use herein is within the ratio range of 0.37 atoms of Ag per atom of Pt to 3:1 of Ag to Pt respectively.

A solvent in which the nitro-containing organic compound is soluble or partially soluble is preferably employed. The solvent is an inert organic solvent, i.e. inert with respect to the nitro-containing compound, and includes for instance a carboxylic acid, for example acetic acid, propionic acid, butyric acid or valeric acid; or an ester, for example ethyl acetate, propyl acetate or ethyl propionate, propyl propionate or methyl acetate. The carboxylic acid is preferred and acetic acid is preferred among such acids. The proportion of solvent employed can range, by weight, from an appreciable amount greater than 0 percent to as high as 95 percent by volume, preferably from about 25–90 percent solvent, the percentages based on solvent plus organic nitrocompound.

Temperatures employed in the hydrogenation of this invention are in general within the range from about 0° C.–400° C., preferably from about 20° C.–100° C. The pressures employed in the hydrogenation can range from sub-atmospheric to 3,000 p.s.i.g., preferably atmospheric pressure to 100 pounds p.s.i.g.

The platinum can be supported on any suitable carrier, e.g. carbon, alumina including activated alumina, kieselguhr, carbonates, for instance calcium carbonate, barium carbonate or strontium carbonate, sulfates, for instance barium sulfate, calcium sulfate or strontium sulfate, asbestos and silica. Carbon is the preferred carrier. The carrier may be in the form of powder, granules, extrusions, or pellets. The metal content of Pt on the support is usually, by weight, about 0.01–15 percent, preferably about 1–5 percent.

The catalyst and silver promoter can be provided in the liquid substrate for hydrogenation either by separately adding the supported platinum catalyst and silver promoter as described herein, or by adding to the liquid substrate a previously prepared composition containing the supported platinum catalyst and silver as promoter. This catalyst, which may contain the ingredients in the preferred amounts previously disclosed, comprises an inert liquid in which the supported platinum catalyst is insoluble or substantially insoluble, the supported platinum catalyst immersed in the liquid, and the silver as promoter for the catalyst distributed throughout the liquid without being alloyed with the platinum. The inert liquid is preferably the inert organic solvent previously disclosed for the organic nitrocompound to be hydrogenated, for instance the carboxylic acid or the ester.

The following examples further illustrate the invention.

EXAMPLE I

In order to determine the effect of various heavy metals on Pt catalysts used in the hydrogenation of nitro-containing compounds, comparative tests were performed.

A 1 liter heavy wall Earlenmeyer flask was charged with catalyst, substrate and solvent in the following manner: 120 mg. of 5% Pt on powdered carbon was placed in the flask. To this was added 7.6 mg. of $Pb(NO_3)_2$. Then 3 ml. of nitrobenzene and 8.7 g. of p-nitrotoluene in 100 ml. of acetic acid were added to the flask.

The flask was then placed in a shaking machine, connected to a gas burette with a leveling bulb, and alternately evacuated and flushed with hydrogen gas. The evacuation procedure was repeated at least 5 times. Then the flask was filled with hydrogen. The shaker, which operated at 280 cycles per minutes, was started and the volume of hydrogen was measured on the burette at various intervals of time. The hydrogenation was run at room temperature and atmospheric pressure.

Similar tests were run using nitrates of copper, nickel, bismuth, chromium and silver instead of $Pb(NO_3)_2$. As a basis for comparison, the same test was run without adding a heavy metal salt to the catalyst.

The results are tabulated in Table I and are expressed in ml. of $H_2$ absorbed in a 15 to 30 minute period.

Table I

| Catalyst | Heavy Metal Salt mg. | Activity ml. $H_2$ absorbed 15–30 minutes |
|---|---|---|
| 120 mg. 5% Pt/C | 0 | 260 |
| Do | 7.6 mg. $Pb(NO_3)_2$ | 150 |
| Do | 2.3 mg. $Cu(NO_3)_2 \cdot 3H_2O$ | 175 |
| Do | 2.15 mg. $Ni(NO_3)_2 \cdot 6H_2O$ | 225 |
| Do | 7.7 mg. $Bi(NO_3)_3 \cdot 5H_2O$ | 190 |
| Do | 1.9 mg. $Cr(NO_3)_3 \cdot 9H_2O$ | 240 |
| Do | 3.9 mg. $AgNO_3$ | [1] 330 |

[1] In the 30–45 minute period 515 ml. of $H_2$ were absorbed. In the same period all other salts give a lower activity than in the 15–30 minute period.

The data in Table I indicates that of the metals tested, Ag was unique in its ability to accelerate the activity of the Pt catalyst.

EXAMPLE II

In order to determine the effect of adding $AgNO_3$ in the hydrogenation of a nitro-containing compound, comparative tests similar to the test described in Example I were run utilizing 5% Pd on powdered carbon as catalyst and with the same substrates and solvents as used in Example I. A comparison of results with and without the addition of Ag shows that when no $AgNO_3$ was added, 440 ml. of $H_2$ were absorbed in the 15–30 minute period. However, when 7.8 mg. of Ag. in the form of $AgNO_3$ was added, 315 ml. of $H_2$ were absorbed in the comparable period. The results show that the activity of the Pd catalyst was decreased by the addition of $AgNO_3$.

EXAMPLE III

In order to illustrate the effect of variation of the ratio of Ag:Pt on the rate of hydrogenation, the results of comparative tests are tabulated in Table II. The test procedure was similar to that used in Example I.

Table II

| Ex. | Pt Catalyst | Substrate | Solvent | Mg. $AgNO_3$ | Ml. $H_2$ absorbed 15–30 min. |
|---|---|---|---|---|---|
| 1 | 120 mg. 5% Pt on powdered carbon. | 8.7 g. p-nitrotoluene. | 100 ml. acetic acid. | 4 | 730 |
| 2 | do | do | do | 4 | 655 |
| 3 | do | do | do | 4 | 675 |
| 4 | do | do | do | 0 | 440 |
| 5 | do | do | do | 2 | 715 |
| 6 | do | do | do | 8 | 705 |
| 7 | 60 mg. 5% Pt on powdered carbon. | do | do | 0 | 195 |
| 8 | do | do | do | 1 | 240 |
| 9 | do | do | do | 2 | 290 |
| 10 | do | do | do | 4 | 235 |
| 11 | do | do | do | 8 | 235 |

Experiments 1–6 show the effect of adding various amounts of silver nitrate. Experiments 1–3 are triplicates and show the general precision of the method. The reproductiveness of these experiments with Ag is something less than is usually found in this kind of rate measurement. Nonetheless all of the catalysts with silver and employing 120 mg. 5% Pt/C as catalyst (experiments 1–3, 5 and 6) are about 60% more active than the unpromoted catalyst (experiment 4). Within the range studied, 2–8 mg. AgNO$_3$ with 120 mg. of 5% Pt/C and up to 8 mg. of AgNO$_3$ with 60 mg. of 5% Pt/C, the promotional effect was large. The atoms of Ag/atom Pt for 2 mg. AgNO$_3$, 4 mg. AgNO$_3$ and 8 mg. AgNO$_3$ per 120 mg. of 5% Pt/C are approximately 0.37, 0.75, and 1.5. For 8 mg. AgNO$_3$ per 60 mg. 5% Pt/C the ratio is approximately 3:1.

The results of experiments 7–11 further evidences the promotional effects of the silver.

EXAMPLE IV

In order to illustrate the effect of the use of Ag with a Pt catalyst on the hydrogenation of nitro-containing compounds when the substrate, solvent and Pt catalyst are varied, results of comparison tests are reported in Table III. The test procedure was similar to that used in Example I. The catalyst, substrate and solvent were varied and comparison tests were run with and without the addition of Ag. The catalyst, substrate and solvent used for each test and the quantities used are shown in the table. The results are reported in Table III as ml. of H$_2$ absorbed in a given period of time, as indicated.

Increased hydrogenation rates by added Ag are not due

*Table III*

| Ex. | Pt Catalyst | AgNO$_3$, mg. | Substrate | Solvent | Ml. H$_2$ 15–30 Minutes |
|---|---|---|---|---|---|
| 1 | 120 mg. 5% Pt on Carbon No. 1 | 0 | 3.5 ml. φNO$_2$, 8.7 g. p-nitrotoluene | 100 ml. acetic acid | [1] 220 |
| 2 | do | 4 | do | do | [2] 330 |
| 3 | do | 4 | 2 ml. acetophenone | do | 10 |
| 4 | do | 0 | do | do | 10 |
| 5 | do | 4 | 4 ml. octene-1 | do | 100 |
| 6 | do | 0 | do | do | 100 |
| 7 | do | 4 | 50 ml. φNO$_2$ | 50 ml. acetic acid | 95 |
| 8 | do | 0 | do | do | 70 |
| 9 | do | 4 | 8.7 g. p-nitrotoluene | 100 ml. acetic acid | 675 |
| 10 | do | 0 | do | do | 440 |
| 11 | 120 mg. of Carbon No. 1 [3] | 4 | do | do | 0 |
| 12 | 120 mg. of 5% Pt on Carbon No. 1 | 4 | 3.5 ml. φNO$_2$ | do | 360 |
| 13 | 120 mg. 5% Pt on Carbon No. 2 | 0 | 3.0 ml. φNO$_2$, 8.7 g. p-nitrotoluene | do | 760 |
| 14 | do | 4 | do | do | 955 |
| 15 | 170 mg. of 5% Pt on Al$_2$O$_3$ | 0 | 8.7 g. p-nitrotoluene | do | 150 |
| 16 | do | 6 | do | do | 230 |
| 17 | 120 mg. of 5% Pt on Carbon No. 1 | 0 | 3.5 ml. nitropropane | do | 10 |
| 18 | do | 4 | do | do | 20 |
| 19 | do | 0 | 3.5 ml φNO$_2$ | 100 ml. ethyl acetate | 190 |
| 20 | do | 4 | do | do | 240 |

[1] This means no 15 minute period higher than 220 ml. H$_2$ absorbed (maximum).
[2] 515 maximum 30–45 minute period.
[3] No platinum.

to any catalytic activity of the Ag itself. This is shown by comparing experiments 9, 10 and 11 of foregoing Table III. In the absence of Pt (experiment 11), the Ag showed zero activity. The promotional effect of Ag is not limited to Pt on any one type of carbon. The improved rate is attained with carbon No. 1 in experiments 1 and 2 of Table III, and also with carbon No. 2 as carrier in experiments 13 and 14 of Table III. Carbon No. 1 is an unwashed carbon and carbon No. 2 an acid washed carbon. The carrier for the Pt is of course not limited to carbon but includes the other carrier materials hereinbefore disclosed. Experiments 15 and 16 of the Table III show the promotion of Pt by Ag on other carriers than carbon. In these two experiments with Pt on powdered Al$_2$O$_3$, a 53% increase in rate was obtained by the addition of silver.

The increased activity of the Pt catalyst as a result of the addition of the Ag was observed when the substrate was an aromatic nitro-containing compound (experiments 1, 2, 7, 9, 12, 14, 16 and 20 of Table III), and an aliphatic nitro-containing compound (experiment 18 of Table III). However, the rate of hydrogenation of the non-nitro-containing compounds, acetophenone and octene-1, was unaltered by the addition of Ag. (experiments 3 and 5 of Table III).

It will be obvious to those skilled in the art that many modifications may be made within the scope of the present invention without departing from the spirit thereof, and the invention includes all such modifications.

What is claimed is:

1. A process for the catalytic hydrogen reduction of at least one organic nitrocompound selected from the group consisting of nitrobenzene, p-nitrotoluene, m-nitrotoluene, m - aminonitrobenzene, 4 - nitrobiphenyl, 4,4' - dinitrobiphenyl, 2,4 - dinitrotoluene, and 2,6-dinitrotoluene, 1 - nitropropane, 1 - nitrobutane, 2 - nitrobutane, 1 - nitroisobutane, 2 - nitroisobutane, 1-nitrobutanol - 4, 1 - nitro - 5 - methoxypentane, 1-nitro-4 - phenylbutane, 1 - nitro - 6 - aminohexane, 3 - nitrobutyric acid and 3-nitroethylbutyrate, to form the corresponding amino compound, which comprises contacting the selected nitrocompound in liquid phase in the presence of hydrogen and at hydrogenating conditions of temperature and pressure within the range from about 0° C.–400° C. and subatmospheric to 3000 p.s.i.g., respectively, with platinum as catalyst supported on a catalyst carrier and silver as promoter for the catalyst, the silver being distributed throughout the liquid without being alloyed with the platinum.

2. The process of claim 1 wherein the silver is present in the liquid in amount within the atomic ratio range of about 0.05:1 to about 10:1 of Ag to Pt respectively.

3. The process of claim 1 wherein the silver is present in the liquid in amount within the atomic ratio range of 0.37:1 to 3:1 of Ag to Pt respectively.

4. The process of claim 3 wherein the platinum metal is present on the support in amount of about 1–5 weight percent.

5. The process of claim 1 wherein the hydrogenation is effected in the presence of an inert organic solvent in which the nitrocompound is at least partially soluble.

6. The process of claim 5 wherein the organic solvent is acetic acid.

7. The process of claim 5 wherein the organic solvent is ethyl acetate.

References Cited by the Examiner

UNITED STATES PATENTS

| 2,802,889 | 8/1957 | Frevel et al. | 260—677 |
| 2,857,337 | 10/1958 | Hamilton et al. | 252—472 |
| 2,967,200 | 1/1961 | Foster et al. | 260—566 |
| 2,967,835 | 1/1961 | Hort | 252—447 |

FOREIGN PATENTS 297,212  9/1928  Great Britain.

MAURICE A. BRINDISI, *Primary Examiner.*

S. T. OZAKI, DALE R. MAHANAND,
*Assistant Examiners.*